United States Patent
Borisov et al.

(10) Patent No.: US 8,737,493 B2
(45) Date of Patent: May 27, 2014

(54) DUAL-CHANNEL RECEIVER FOR POWERLINE COMMUNICATIONS

(75) Inventors: Vladimir Borisov, Seneca, SC (US); Philippe Chiummiento, Seneca, SC (US)

(73) Assignee: Itron, Inc., Liberty Lake, WA (US)

( * ) Notice: Subject to any disclaimer, the term of this patent is extended or adjusted under 35 U.S.C. 154(b) by 114 days.

(21) Appl. No.: 13/275,812

(22) Filed: Oct. 18, 2011

(65) Prior Publication Data

US 2013/0094596 A1 Apr. 18, 2013

(51) Int. Cl.
*H04B 3/00* (2006.01)

(52) U.S. Cl.
USPC ........... 375/257; 375/224; 375/228; 455/282; 370/445; 702/60; 702/62; 702/65; 324/522; 324/525; 324/691; 324/713

(58) Field of Classification Search
USPC ........... 375/257, 224, 228; 455/282; 370/445; 702/60, 62, 65; 324/522, 525, 691, 713
See application file for complete search history.

(56) References Cited

U.S. PATENT DOCUMENTS

| | | | |
|---|---|---|---|
| 7,200,502 B2 * | 4/2007 | Gasperi et al. ............. | 702/65 |
| 7,339,466 B2 | 3/2008 | Mansfield et al. | |
| 7,583,197 B2 | 9/2009 | Swaay | |
| 7,755,371 B2 * | 7/2010 | Wells ............................. | 324/713 |
| 8,094,010 B2 | 1/2012 | Swaay | |
| 8,228,252 B2 * | 7/2012 | Kato et al. ..................... | 343/745 |
| 2004/0246108 A1 | 12/2004 | Robertson et al. | |
| 2005/0169056 A1 * | 8/2005 | Berkman et al. .......... | 365/185.22 |
| 2007/0076595 A1 | 4/2007 | Lee et al. | |
| 2008/0088296 A1 * | 4/2008 | Makinson et al. ............ | 324/110 |
| 2010/0007354 A1 * | 1/2010 | Deaver et al. ................ | 324/539 |
| 2010/0301872 A1 * | 12/2010 | Kereit et al. .................. | 324/521 |

OTHER PUBLICATIONS

Apr. 4, 2012 Office Action issued in Canadian Patent Application No. 2,755,339.
PCT International Search Report for PCT International Application No. PCT/US2011/062808, search completed Feb. 10, 2012; report mailed Feb. 22, 2012.
Written Opinion of the International Searching Authority for PCT International Application No. PCT/US2011/062808, opinion completed Feb. 10, 2012; date of mailing Feb. 22, 2012.
Oct. 9, 2012 Office Action issued in Canadian Patent Application No. 2,755,339.

* cited by examiner

Primary Examiner — Leon Flores
(74) Attorney, Agent, or Firm — Lee & Hayes, PLLC

(57) ABSTRACT

The presently disclosed subject matter relates to powerline communications (PLC) in an advanced metering infrastructure (AMI) environment. A communications signal is applied to a power line by a PLC transmitting device. A receiver is provided that evaluates communications signals based on the power coupled to the power line by the transmitting device. In one present embodiment, PLC signal voltage and current levels are multiplied together to evaluate signal power to reproduce received PLC signals.

20 Claims, 2 Drawing Sheets

DUAL-CHANNEL RECEIVER FOR POWERLINE COMMUNICATIONS

FIELD OF THE SUBJECT MATTER

The presently disclosed subject matter relates to communications. More specifically, the presently disclosed subject matter relates to powerline communications (PLC) such as useful for automatic meter reading (AMR) requirements.

BACKGROUND OF THE SUBJECT MATTER

Generally, an automatic meter reading (AMR) installation may contain thousands, and possibly millions of metering devices distributed over a relatively large geographical area. Such devices are in many instances configured to exchange messages including data, for example, utility consumption data, with a cluster of servers including data metering collectors, and network management servers. AMRs are in some configurations organized around autonomous systems headed by cell relays, sometimes referred to as cell routers, where each autonomous system is connected to servers that may be located at the utility home office by way of a backhaul network. In certain such systems, Power Line Communication (PLC) systems may be employed to provide the backhaul network as well as to provide other system communications needs.

Power Line Communication (PLC) systems utilize the electrical infrastructure for carrying data. PLC systems may be used for communications over different segments of an overall power system, e.g., segments including high voltage transmission lines, medium voltage distribution networks, and lower voltages lines such as inside buildings. The ability of a communication system to deliver a certain amount of data per unit of time with limited number of errors is determined, at least in part, by the ratio of the energy contained in a data bit to the spectral density of noise within the channel bandwidth, i.e., the "Eb/No" ratio.

Unlike other communication systems, PLC links are often characterized by the voltage magnitude at the modem side of line couplers instead of being characterized by the power flow in the communication medium. An argument can be made that such approach is adequate, at least in certain instances, since from the transmitter side the highest drive level may be assumed to correspond to the maximum transmitted power while from the receiver side the signal-to-noise ratio seems to be independent from its notation since all signals (interferers and noise) are presented across the same line impedance, which consequently then does not need to be defined.

Alternatively, a counterargument is applicable because the transfer functions of line couplers are strongly affected by their associated complex line impedance. Thus, driving a transmitter to its maximum level may in fact be wasteful due to severe mismatch conditions between the coupler and the line. Considering the receiver side, a voltage-sensing receiver (i.e., a receiver having a high input impedance) may be connected to a long electrical conductor along with multiple mismatched loads and multiple sources of interference. In such a case, the aggregate voltage signal at any location represents a superposition of multiple voltage standing waves. Under such conditions, it is possible that a receiver might by happenstance be located in the minimum of a standing wave created by a strong transmitter while in the maximum of a standing wave created by a weak interference signal. Since the number of interference signals may be quite large, the probability of desired signals being blocked may remain high.

In view of such practical issues, it would be desirable to provide apparatus and methodologies whereby power line communications (PLC) signals may be received even in the presence of high noise levels. Nevertheless, while various aspects and alternative embodiments may be known in the field of power line communications, no one design has emerged that generally encompasses the above-referenced characteristics and other desirable features associated with power line communications technology as herein presented.

SUMMARY OF THE SUBJECT MATTER

In view of the recognized features encountered in the prior art and addressed by the presently disclosed subject matter, improved technology for providing power line communications has been provided. In accordance with presently disclosed technology, a dual-channel PLC reception technique has been provided which enables a "power-sensing" approach by simultaneously measuring two signals associated with the power line. In an exemplary configuration and in accordance with one embodiment of the presently disclosed subject matter, a "power-sensing" receiver is provided that corresponds to a dual-channel technique where a first channel represents a high-impedance PLC receiver configured to sense a signal voltage between the power line mains while a second channel is configured with a low-impedance current sensor to sense a signal representing the signal current through the power line conductor.

The presently disclosed subject matter relates to a dual-channel power line communications (PLC) receiver. Such receiver in some present exemplary embodiments may include a first sensor configured to sense a first characteristic of a signal produced in a power line by a PLC transmitter and to provide a first signal representative thereof, and a second sensor configured to sense a second characteristic of the signal produced in a power line by the PLC transmitter and to provide a second signal representative thereof. A processor may be provided that is configured to combine the first signal and the second signal to produce an output signal representative of a received PLC signal.

In selected embodiments, the first characteristic may correspond to a signal voltage level, and the second characteristic may correspond to a signal current level. In certain of such exemplary embodiments, the first sensor may be a transformer having a first winding configured to be coupled to a power line. In other embodiments, the second sensor may be an inline current sensor. In still further selected embodiments, the processor may be configured to multiply the first and second signals together.

The presently disclosed subject matter equally relates to methods as well as apparatus for receiving power line communications (PLC) signals applied to a power line. In accordance with an exemplary method, two signal characteristics associated with a power line may be concurrently monitoring and evaluating to produce signals indicative of the PLC signals. In certain embodiments, the two signal characteristics may correspond to a signal voltage and a signal current. In selected embodiments, the method may evaluate the signals by multiplying the two signals together.

In particular embodiments, one of the signal characteristics may correspond to one of a signal voltage and current, while the other of the signal characteristics may correspond to a line impedance at the signal frequency.

The presently disclosed subject matter also equally relates to advanced metering infrastructure (AMI). In such embodiments, a power line infrastructure may be provided and configured to transport alternating current from a source to a user location by way of at least one power line. A source of powerline communications (PLC) signals may be coupled to the power line and a communications receiver may be coupled to the power line. In such embodiments, the communications receiver may be configured to evaluate the power level of PLC signals applied to the power line based on two concurrently monitored characteristics to reproduce the PLC signals. In particular embodiments, the receiver may be configured to evaluate the power level based on signal voltage and current levels associated with the power line.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which.

Figure 1:
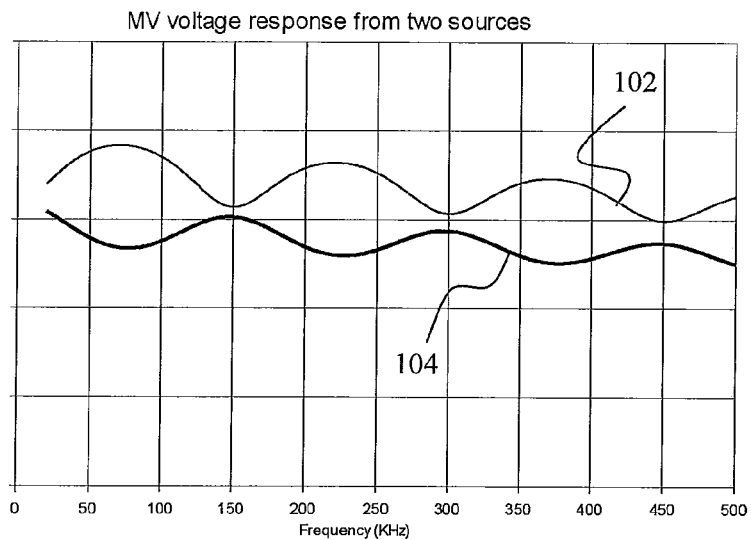
FIG. 1 graphically represents voltage responses from two sources applied to a medium voltage (MV) power line.

Repeat use of reference characters throughout the present specification and appended drawings is intended to represent same or analogous features, elements, or steps of the presently disclosed subject matter.

DETAILED DESCRIPTION OF THE SUBJECT MATTER

As discussed in the Summary of the Subject Matter section, the presently disclosed subject matter is particularly concerned with methodology and corresponding apparatus for providing improved power line communications in a potentially noisy advanced metering infrastructure (AMI) environment.

With initial reference to FIG. 1, there is illustrated a graphical representation generally 100 of voltage responses from two sources applied, for example, to a medium voltage (MV) power line. Graph 100 represents a model of an electrically long conductor and depicts plots of the frequency-dependent magnitude of the voltage signals from two generators located at opposite ends of exemplary 3 km long segments of a MV transmission line. The exemplary receiver measuring the responses is positioned close to the middle of the segments. Upper trace 102 of graph 100 represents useful signals while trace 104 represents an interfering signal.

Figure 2:
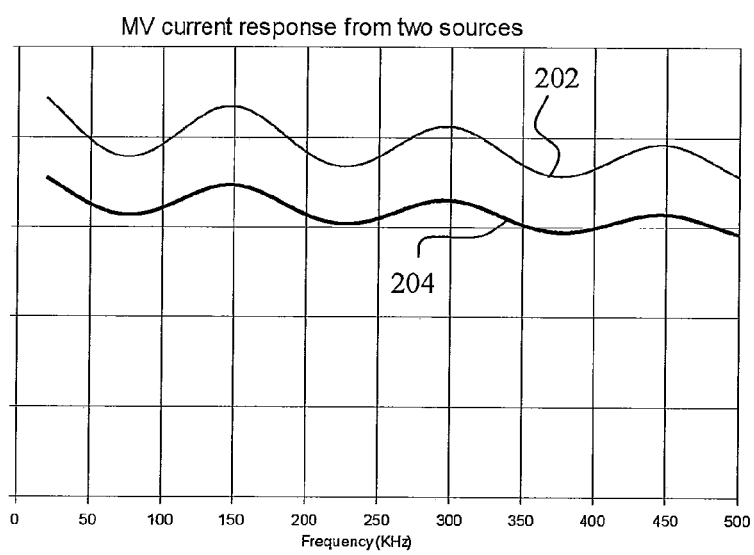
FIG. 2 graphically represents current responses from two sources applied to a the same MV power line.

Similarly, with reference to FIG. 2, there is illustrated a graphical representation 200 of current responses from the same two sources, that is, a first source representing useful information and a second source representing an interference source. In such case, upper trace 202 represents a useful current signal while lower trace 204 results from an interfering current signal.

Figure 3:
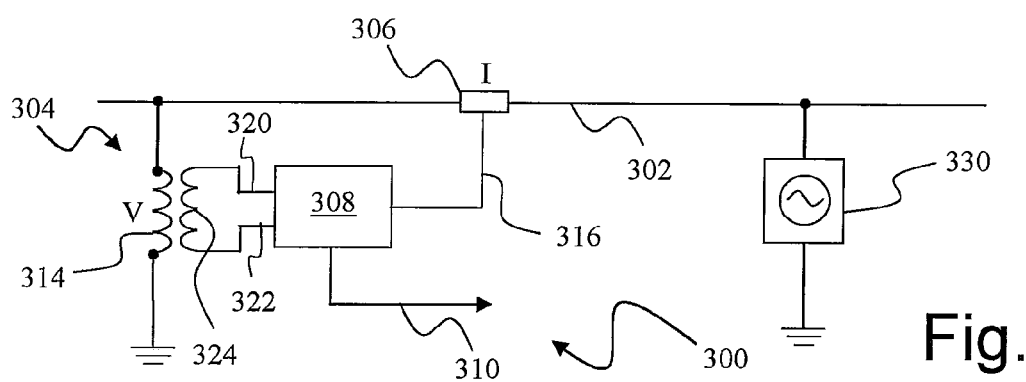
FIG. 3 is a schematic representation of a portion of a PLC receiver constructed in accordance with presently disclosed technology.

With reference to FIG. 3, in accordance with a first embodiment of the present disclosure, an exemplary representative dual-channel PLC receiver generally 300, including respective voltage-sensing channel and current-sensing channel features, has been provided to improve reliability of communications over large inhomogeneous electrical distributed networks. As illustrated in FIG. 3, a representative voltage-sensing circuit may be provided by way of a voltage sensing transformer 304 while a representative current-sensing circuit may be provided by way of current sensor 306.

As may be seen from FIG. 3, exemplary voltage-sensing transformer 304 may be coupled by way of representative primary winding 314 to power line 302 that may be part of a power line infrastructure while current sensor 306 may be coupled inline with representative power line 302. Voltage-sensing transformer 304 may then be configured to provide signals representative of a first characteristic of the PLC signals applied to line 302 by way of, for example, representative PLC transmitter 330 (details of which form no particular aspect of the presently disclosed subject matter). In other words, voltage-sensing transformer 304 may apply to a processor 308 a signal voltage V (originally applied to line 302 from PLC transmitter 330) by way of signal lines 320, 322 coupled to a secondary winding 324 of transformer 304. In similar fashion, current sensor 306 may be configured to provide signals representative of a second characteristic of the PLC signals induced in line 302, by way of signal line 316 to processor 308, and representative of the signal current I flowing through line 302.

Those of ordinary skill in the art will appreciate that various sensors may be provided to supply the voltage and current signals, details of which sensors form no particular aspect of the presently disclosed subject matter. For example, a voltage divider circuit may be employed instead of, or in addition to, transformer 304. Such voltage dividers may correspond to resistor and/or capacitor dividers or other type voltage divider circuit, while current sensor 306 may correspond to, for example and without limitation, inline shunt devices, Hall-effect devices, toroid sensors, a tapped section of the power line itself, or other suitable sensors.

Regardless of the type of sensors used, the presently disclosed subject matter recognizes that the Signal-to-Noise ratio for a PLC receiver may be significantly improved using a dual-channel approach that analyzes the power coupled to the power line by the information transmitting device. In such regard, processor 308 is configured to receive input signals representative of, for example, the line voltage and current as previously described from signal lines 320, 322, and 316, and to use such signals to calculate power using known techniques (details of which form no particular part of the presently disclosed subject matter).

In an exemplary case, such calculation may correspond to simply multiplying the signals from lines 320, 322 representing line signal voltage V by the signals from line 316 representing current signal I, and producing an output on output line 310 representing such multiplication. The output signal on line 310 may then be further processed to "decode" or "demodulate" the original information signal. Alternatively, processor 308 may contain sufficient capability to perform the decoding or demodulation itself and, therefore, may provide a further processed signal on output line 310.

Alternative methodologies may also be employed to determine PLC signal power including other known techniques for calculating power. For example, sensed signal current or voltage may be used together with a simultaneously monitored impedance at the signal frequency to determine signal power.

Figure 4:
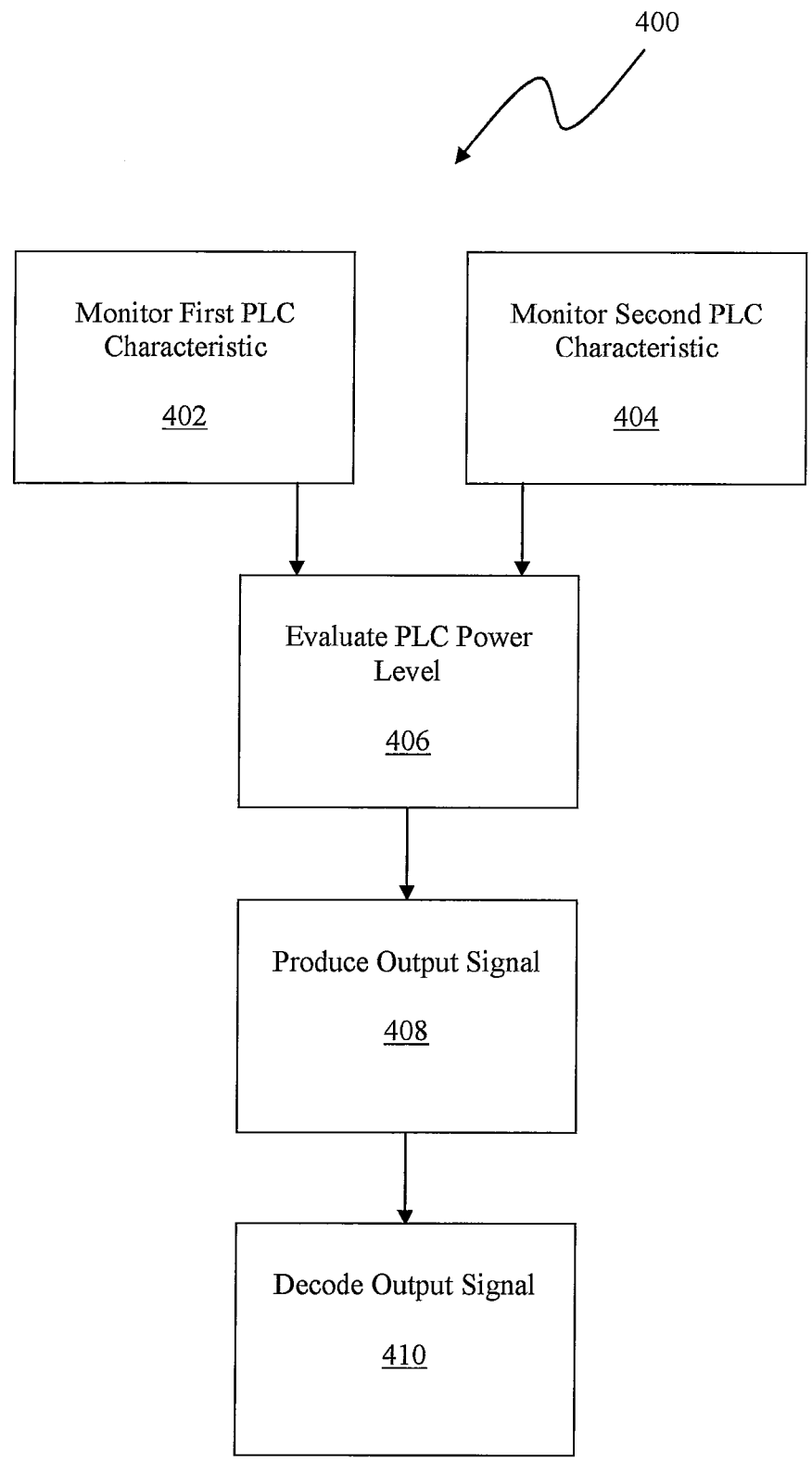
FIG. 4 is a flow chart illustrating methodologies as may be employed with the presently disclosed subject matter.

With present reference to FIG. 4, there is provided a flow chart 400 illustrating methodologies as may be employed with the presently disclosed subject matter. As seen from FIG. 4, a first characteristic of a power line communications (PLC) signal is monitored in step 402 while, simultaneously, a second PLC signal characteristic is monitored in step 404. In one exemplary embodiment the first characteristic may correspond to a voltage signal generated by a PLC signal impressed upon a power line while the second characteristic may correspond to a current signal produced by the same PLC signal. In alternative embodiments, one of the characteristics may correspond to a line impedance while the other PLC signal characteristic may correspond to one of the voltage or current signals.

Regardless of the characteristic pair chosen, in step 406 an evaluation is made to determine the power level of the PLC signal within the power line produced by the PLC signal. In the case of the first and second chose characteristics being voltage and current, such power level simply corresponds to the value produced by multiplying the voltage and current signals together. Similarly, when one of the characteristics corresponds to line impedance, the power level may be calculated using known formulas depending on whether the other characteristic corresponds to voltage or current.

Following evaluation in step 406, an output signal representative of the power level in the PLC signal is produced at step 408. This signal may then be further evaluated to provide a "decoded" or "demodulated" version thereof in step 410 to reproduce the original signal applied to the power line by, for example, a PLC transmitter.

While the presently disclosed subject matter has been described in detail with respect to specific embodiments thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the presently disclosed subject matter as would be readily apparent to one of ordinary skill in the art.

What is claimed is:

1. A dual-channel power line communications (PLC) receiver, comprising: a first sensor configured to sense a first characteristic of a signal produced in a power line by a PLC transmitter and to provide a first signal representative thereof, wherein the first signal corresponds to one of a signal voltage and a signal current; a second sensor configured to sense a second characteristic of the signal produced in the power line by the PLC transmitter and to provide a second signal representative thereof, wherein the second signal corresponds to a line impedance at a frequency of the signal; and a processor configured to combine the first signal and the second signal to produce an output signal representative of a received PLC signal.

2. A receiver as in claim 1, wherein said first characteristic comprises a signal voltage level.

3. A receiver as in claim 1, wherein said first sensor comprises a transformer having a first winding configured to be coupled to a power line with which said receiver is associated.

4. A receiver as in claim 1, wherein said first sensor comprises an inline current sensor.

5. A receiver as in claim 1, wherein said processor is configured to evaluate a power level indicated by said first and second signals.

6. A receiver as in claim 1, wherein:
said first characteristic comprises a signal voltage level, and said first sensor comprises a transformer having a first winding configured to be coupled to a power line with which said receiver is associated.

7. A receiver as in claim 1, wherein the processor receives inputs from a secondary winding of a transformer.

8. A receiver as in claim 1, wherein the processor is configured to calculate a power level of the received PLC signal.

9. A receiver as in claim 1, wherein the processor receives inputs associated with the first and second characteristics.

10. A method for receiving power line communications (PLC) signals applied to a power line, comprising:
concurrently monitoring two PLC signal characteristics associated with the power line, wherein a first of the PLC signal characteristics corresponds to one of a signal voltage and a signal current, and a second of the PLC signal characteristics corresponds to a line impedance at a signal frequency;
evaluating a PLC signal power level, based at least in part on the two PLC signal characteristics, produced within the power line; and
producing signals, based at least in part on the evaluated PLC signal power level, indicative of the PLC signals.

11. A method as in claim 10, wherein the first of the two PLC signal characteristics corresponds to a signal voltage.

12. A method as in claim 10, wherein:
such producing comprises producing two signals respectively indicative of the two PLC signal characteristics; and
such evaluating comprises multiplying such two signals together.

13. A method as in claim 10, wherein the concurrent monitoring comprises receiving inputs from a secondary winding of a transformer at a processor.

14. A method as in claim 10, wherein the concurrent monitoring comprises receiving inputs associated with the two PLC signal characteristics at a processor.

15. An advanced metering infrastructure (AMI), comprising:
a communications receiver coupled to at least one power line to receive power line communications (PLC) signals carried by the at least one power line, said communications receiver being configured to evaluate a power level of PLC signals applied to the at least one power line based on two concurrently monitored characteristics to reproduce the PLC signals coupled to said at least one power line, wherein said communications receiver comprises a dual-channel receiver with a first channel comprising a high-impedance PLC receiver configured to sense a signal voltage between two power lines, and with a second channel configured as a low-impedance current sensor to sense a signal current through at least one of the two power lines.

16. An advanced metering infrastructure as in claim 15, wherein said receiver is configured to evaluate said power level based on signal voltage and current levels associated with said at least one power line.

17. An advanced metering infrastructure as in claim 15, wherein the communications receiver is additionally configured to evaluate the power level of PLC signals based at least in part on a processor having inputs from the two concurrently monitored characteristics.

18. An advanced metering infrastructure as in claim 15, wherein the communications receiver is additionally configured to evaluate the power level of PLC signals based at least in part on a processor having inputs from a secondary winding of a transformer.

19. An advanced metering infrastructure as in claim 15, wherein the communications receiver is additionally configured to evaluate the power level of PLC signals based at least in part on a processor configured to calculate the power level of PLC signals applied to the at least one power line.

20. An advanced metering infrastructure as in claim 15, wherein the communications receiver is additionally configured to evaluate the power level of PLC signals based at least in part on a processor configured to calculate the power level of PLC signals and to provide a representation of the calculation on a single output line.

* * * * *